Figure 1:
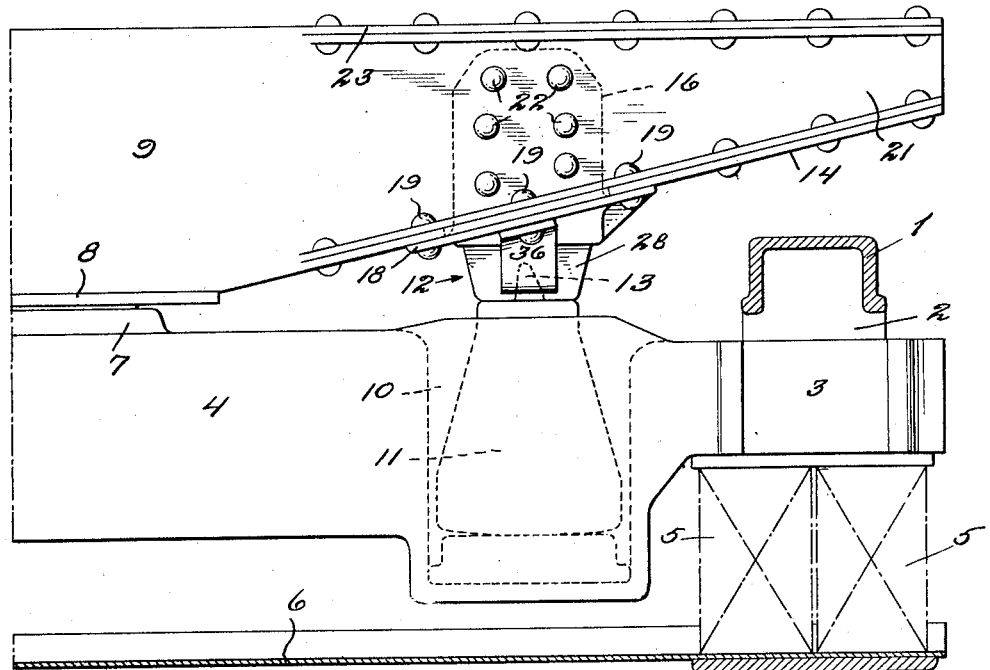

Oct. 31, 1933.　　　T. R. SYMINGTON　　　1,933,458

CAR BODY SIDE BEARING

Filed Feb. 29, 1928　　　3 Sheets-Sheet 1

Inventor
Thomas R. Symington
By
his Attorney

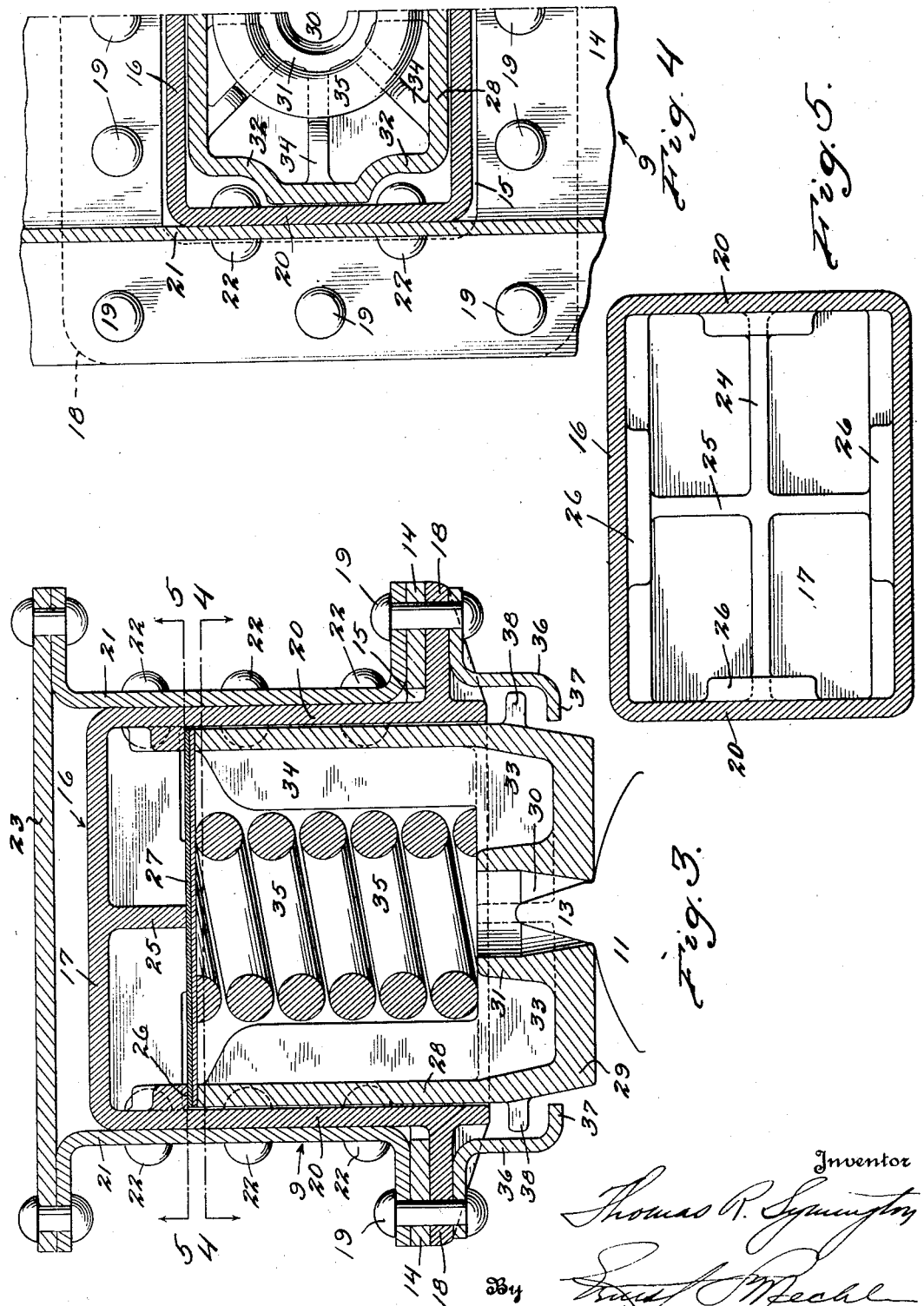

Oct. 31, 1933.    T. R. SYMINGTON    1,933,458
CAR BODY SIDE BEARING
Filed Feb. 29, 1928    3 Sheets-Sheet 3

Inventor
Thomas R. Symington
By Ernest F. Mechlin
his Attorney

Patented Oct. 31, 1933

1,933,458

UNITED STATES PATENT OFFICE 1,933,458

CAR BODY SIDE BEARING

Thomas R. Symington, Pasadena, Md., assignor to T. H. Symington & Son, Inc., Baltimore, Md., a corporation of Maryland Application February 29, 1928. Serial No. 257,867

13 Claims. (Cl. 308—224)

The invention relates to side bearings for railway cars, such bearings cooperating with truck side bearings for properly supporting the car body with respect to the truck.

The invention has special reference to an equipment wherein the truck bolster is provided with side bearings for taking the load instead of the weight being sustained upon center bearings as is usually the case, a stable, four point suspension being thus provided and the usual center plate acting simply as pivot means permitting relative swivelling movement of the truck and body bolsters as must occur in car travel. Such a construction is illustrated in the application of Percy R. Drenning for patent for Truck bolster and side bearing bolster with lateral motion means, filed March 22nd, 1927, bearing Serial No. 177,340, and assigned to the same assignee as the present application. Said application discloses side bearing assemblies mounted on or in and forming part of a car truck and cooperating with side bearing members which depend from the body bolster of the car, said side bearing assemblies having universal movement so as to support the load while permitting free relative swivelling movement of the truck and body bolsters and lateral motion of the latter as will occur during car travel, for instance when rounding curves.

The principal object of the present invention, generally stated, is to provide yieldable or cushioned side bearing members carried by the car body bolster and coacting with said side bearing assemblies carried by the truck bolster, the arrangement being such that the depending bearing elements will always be maintained in contact with the side bearing rockers, or their equivalent, any clearance resulting from wear or from improper adjustment of the center bearing and center plate with respect to each other will be prevented, pounding and a tendency toward the development of car roll or side sway being likewise avoided.

The object of the invention, more specifically stated, is to provide a body bolster side bearing embodying or including spring means acting to force it downwardly for maintaining a positive contact with the rocker, the spring means having an appreciable travel whereby the result will be certain.

A still more specific object of the invention is to provide a body side bearing embodying a relatively stationary portion fixed to the body bolster and a relatively movable portion spring-pressed into engagement with the truck side bearing rocker or the like, the spring means being of such design and capacity that when the light car weight is upon the side bearing the two parts of the bearing are in contact, the contact being broken only when the weight on the side bearing is of less magnitude than the light weight of the car.

Another object of the invention is to provide a body side bearing structure of this character having means for limiting the movement of the relatively movable portion and also means for adjusting the normal position of the relatively movable portion with respect to the stationary portion, this latter feature being of advantage when different conditions exist as for example when there may be no clearance or an unusual degree of clearance between the rockers or the like on the truck bolster and the relatively movable portions of the body side bearing members.

A further object of the invention is to provide a body side bearing structure of this character which, though necessitating cutting away a part of the bottom plate of the body bolster for permitting installation, will more than compensate for the loss in strength resulting from such cutting away by acting as a reinforcement for the body bolster and materially strengthening the same.

Yet another object of the invention is to provide a side bearing structure of this character which may be installed in the body bolster without it being necessary to remove the top plate thereof, the arrangement of the rivets or other similar securing elements being such that they may be inserted from the bottom of the bolster.

An additional object is to provide a structure or device of this character which will be comparatively simple and inexpensive to make, easy to install, which involves no change in the construction of the truck and no change in the body bolster other than providing the necessary opening in the bottom plate and which will moreover be highly efficient in action, durable in service, and a general improvement in the art.

Figure 2:
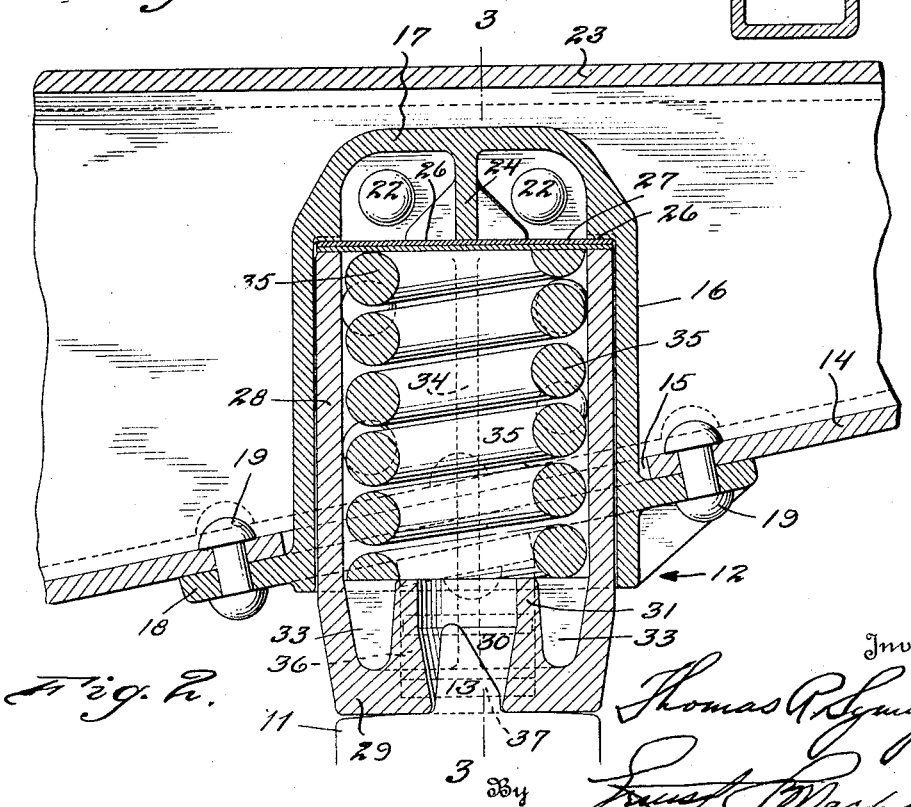
Figure 7:
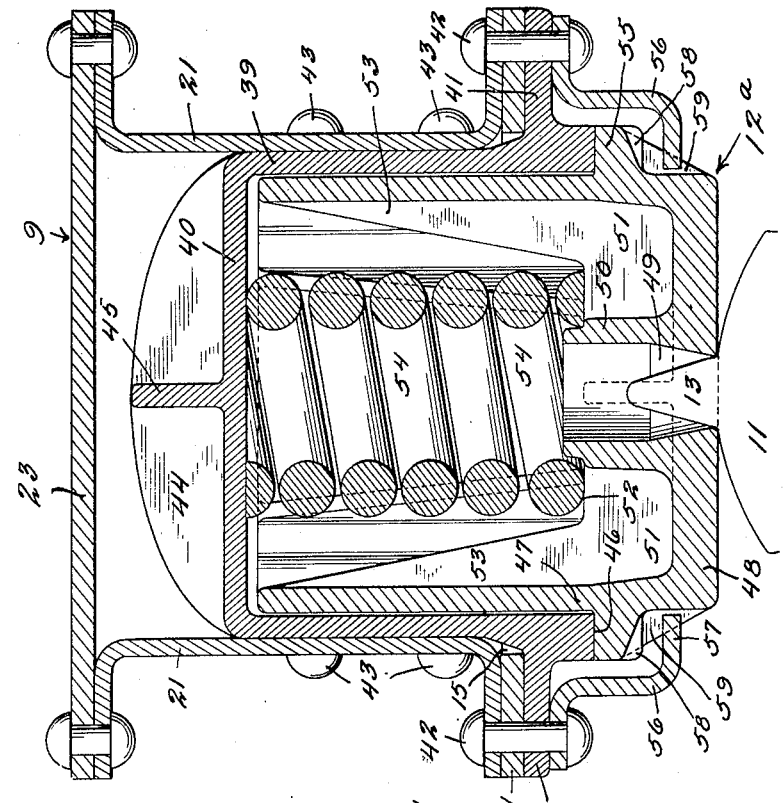
Figure 6:
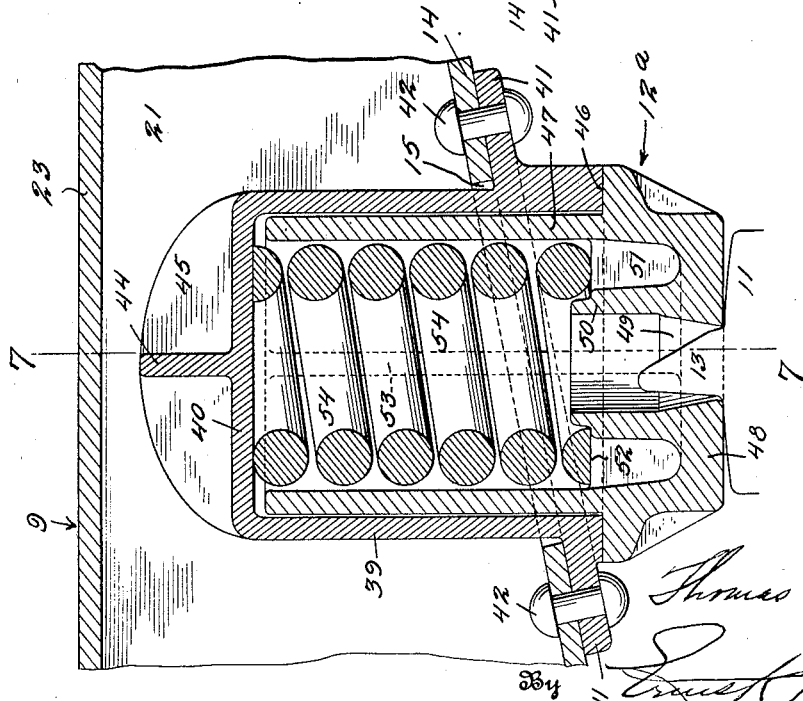

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of one end portion of a railway truck and body bolster, showing one form of the invention applied thereto, parts being broken away and in section and the truck bolster supporting springs being shown diagrammatically, Figure 2 is a vertical longitudinal section through one end portion of the body bolster equipped with the same form of my improved body side bearing, the latter being also in section, Figure 3 is a vertical cross sectional view taken on or substantially on the line 3—3 of Figure 2, Figure 4 is a horizontal cross sectional view taken on the line 4—4 of Figure 3 and looking downwardly, Figure 5 is a similar view taken on the line 5—5 of Figure 3 and looking upwardly, Figure 6 is a view similar to Figure 2 and showing a modified form of the invention, Figure 7 is a vertical cross sectional view taken on the line 7—7 of Figure 6.

Referring more particularly to the drawings, I have illustrated a portion of a railway car truck in which the numeral 1 designates the side frame having the usual window opening 2 within which is received the end 3 of the truck bolster 4 supported by the usual truck springs 5 mounted beneath the end 3 and seated upon the spring plank 6 which in turn seats at the bottom of the opening 2. At the center of its top the truck bolster 4 has a guide bearing 7 thereon receiving the center plate 8 which depends from the center of the body bolster 9. Near its end portion 3 the truck bolster 4 is shown as formed with a pocket 10 within which is mounted a side bearing 11 which may be a single rocker capable of universal movement or which may be built up of sections as disclosed in said co-pending application, this detail being immaterial. It is intended that the member 7 be a guide rather than a true center bearing inasmuch as its function is to guide the center plate 8 while permitting lateral motion of the body bolster 9 with respect to the truck side frames. The rocker 11 must be capable of universal movement or at least its upper end must be capable of such movement for co-operation with the depending side bearing elements, indicated as a whole by the numeral 12 in Figures 1, 2 and 3, and by the numeral 12ª in Figures 6 and 7, when the truck and body bolsters have relative swivelling movement and when lateral motion of the body bolster occurs. The rocker 11 is shown as provided at its upper end with a lug, tooth or stub 13 designed to coact with appropriate means on the body side bearing for preventing disassociation of these parts at any time, this detail being described more fully hereinafter but being mentioned at this time for the reason that such a tooth appears on the rocker in said co-pending application. Thus far reference has been made only to one side of the truck or to one end of each of the truck and body bolsters though of course it should be understood that both ends are necessarily the same, only one being illustrated and described as such is entirely sufficient for disclosure purposes.

In carrying out the invention and in applying either form thereof the bottom plate 14 of the body bolster must be cut away or formed in sections to provide an opening 15 for the accommodation of the bearing structure 12 or 12ª as the case may be.

In the form of the invention disclosed in Figures 1 to 5 inclusive, I provide a housing or casing 16 which fits up into the body bolster and which has a closed top 17 and an open bottom. Adjacent the lower end or bottom, the housing or casing 16 is formed with an outstanding flange 18 located beneath the bottom plate and extending laterally in all directions beyond the opening 15, rivets or the like 19 being applied through this flange and the bottom plate for effecting securing. The casing or housing is preferably of sufficient width to extend clear across from side to side of the body bolster and the sides 20 of the housing are preferably secured to the channeled side plates 21 of the body bolster by a suitable number of rivets or the like 22. It will be observed that these rivets may be placed in position from the bottom of the bolster and inserted through appropriate holes in the sides, the operation being readily capable of accomplishment without disturbing the top plate 23 of the bolster. By having a housing or casing extend the full width of the truck bolster, by riveting the sides of the former to the sides of the latter and by securing the outstanding flange 18 to the bottom plate it is quite apparent that the housing or casing will operate as a reinforcement and will effectually brace the bolster and more than compensate for the cutting away of the bottom plate to provide the opening 15.

Within its upper or closed end the housing or casing 16 is formed, preferably, with intersecting longitudinal and transverse webs 24 and 25 respectively which have their lower edges flush with ledges or shoulders 26 on all four sides of the housing. The ledges or shoulders and the lower edges of the intersecting webs serve as abutment means for the uppermost one of any desired number of shims 27 which may or may not be used, depending upon circumstances, but at least one of which is preferably employed.

Vertically slidably mounted within the casing or housing 16 is the relatively movable side bearing member 28 having an open top and a preferably thickened bottom 29 formed with a central opening 30 for the accommodation and reception of the upstanding lug, tooth or stub 13 carried by the truck side bearing rocker. While it is not essential the lower end portion of the member 28 is preferably beveled off or tapered and the opening 30 is preferably surrounded by an upstanding flange 31. To avoid binding of the parts during relative swivelling movement of the truck and body bolsters and/or during lateral motion of the latter, the tooth or lug 13 is of tapered form and preferably flattened at one side and the opening 30 is of preferably inverted frusto-conical shape as clearly indicated. However, these are minor details which might be readily varied without in any way departing from the spirit of the invention. It is of course intended that the lower edge of the opening 30 bear upon the top of the rocker 11 about the tooth or lug thereon, this contact being maintained at all times by means to be described. Inasmuch as the member 28 is intended to move up and down within the housing or casing the corners thereof are extended inwardly as shown at 32 to avoid interference with the rivets 22. Interiorly the bottom portion 29 of the relatively movable member 28 is reinforced by radial ribs 33 which are shown as having their upper edges flush with the top of the flange 31 and which merge into other webs 34 projecting inwardly from the opposite sides and the corner portions of the member 28, the latter mentioned webs being spaced apart preferably substantially the same distance as the ends of the member 28 so as to provide guide and retaining means for a helical spring 35 which abuts against the underside of the shim or shims 27 and upon the top of the webs 33, the purpose of this spring being to force the member 28 downwardly into close contact with the rocker 11 at all times.

To prevent disassembly of the parts during transportation or during handling at any time prior to installation in a car, and to limit downward movement of the member 28 beyond a predetermined extent at all times, I may provide angular stop brackets 36 located at opposite sides of the body bolster and secured by the rivets 19, these brackets 36 having lateral lower ends 37 directed toward each other and located in the path of movement of stop lugs 38 projecting laterally from the lower portion of the member 28.

Assuming that the device has been constructed and installed within each end of the body bolster, it will be seen that the members 28 will bear upon the rockers 11 and support the load at all times. The arrangement of the parts and the capacity of the springs 35 are such that even under light car conditions the relatively movable members 28 will be in their uppermost positions with the springs under compression. When the weight on either truck side bearing becomes less than the normal light car pressure the spring 35 at the light side will project the movable member 28 downwardly and consequently maintain it in engagement with the associated rocker. The effect of this is that upon rebound or recoil, which if unchecked would tend to develop side sway or car roll, the force tending to produce this result will be absorbed by the compression of the spring 35 upon the consequent upward movement of the member 28 which has been previously forced downwardly. This peculiar spring side bearing therefore operates to take up or prevent any clearance such as may occur between body side bearing elements of ordinary type and the coacting truck side bearing elements and also acts to cushion and check any tendency toward lateral rocking, the first mentioned action being of benefit in preventing pounding of the bearings, and the latter having the advantage of preventing car roll, and both performing the function of saving all the truck parts from undue strain and wear so that the life thereof should be materially increased.

To take up wear in the parts additional shims 27 may be inserted, this providing a very convenient means for effecting adjustment not only in this respect but as will readily be apparent to one skilled in this art, it being readily conceivable that after the lapse of considerable time the constant frictional engagement of the movable member 28 with the rocker will cause an increase in the distance the member 28 would need to be moved inwardly. The degree of outward movement might be varied by changing the length of the stop brackets 36.

In Figures 6 and 7 I have shown a modification of the invention, there being, however, no change from the general principles embodied in the construction above described and illustrated in Figures 1 to 5 inclusive. Referring to these two figures in detail, there is provided a housing or casing 39 closed at its top 40 and open at its bottom and provided with an outstanding flange 41 at its lower end extending beyond the opening 15 in the bottom plate of the bolster and secured by rivets 42 corresponding to the rivets 19. This housing or casing extends from side to side of the bolster and is riveted to the side plate thereof by rivets 43 corresponding to the rivets 22. The closed upper end 40 is preferably reinforced by longitudinal and transverse ribs 44 and 45 respectively which are, however, located exteriorly instead of interiorly as are the ribs 24 and 25 in the first described form. The lower or open end is preferably thickened to provide increased strength at the lower edges which constitute abutment shoulders 46.

Vertically slidably mounted within the housing or casing 40 is a relatively movable member 47 having its bottom 48 closed except for an opening 49 corresponding to the opening 30 and provided for the purpose of accommodating the lug or tooth 13 on the rocker 11. The corner portions of the member 47 are necessarily inwardly offset in exactly the same manner as the corners 32 of the member 28 in the first described form so as to avoid interference with the rivets 43. The opening 49 is surrounded by an upstanding flange 50 into which merge webs 51 which have horizontal shoulders 52 and which are prolonged upwardly as shown at 53 to constitute guide and retaining means for a helical spring 54 which abuts against the underside of the closed top 40 and upon the shoulders 52.

The principal difference between this form of the invention and the first described form is that in this instance the movable member 47 is formed with a peripheral laterally extending flange 55 which normally abuts against the shoulder 46 for limiting the upward movement of the member 47. The downward movement thereof may be limited by angular brackets 56 similar to the brackets 36 and likewise secured to the rivets 42 corresponding to the rivets 19, these brackets having inwardly directed lower ends 57 disposed in the path of movement of projections 58 at the underside of the peripheral flanges 55. The flange and the projections may be reinforced by webs 59.

It will be seen that this modified form of the invention operates in substantially the same manner as the first described form, the only difference being in the detailed features. In the first described form the upper end of the movable member abuts against stop means within the upper end of the housing or casing whereas in this second form the upward movement is limited by the engagement of the flange or flanges 55 with the shoulders 46. Likewise, this form is as easily capable of installment as the first and possesses identically the same advantages when applied to a car.

From the foregoing description and a study of the drawings it will be apparent that I have thus provided very simple means for accomplishing the desired result specified above. It will be noted that the installation of this additional equipment involves no changes whatsoever in the construction of the truck bolster or other truck parts and no changes in the body bolster other than the provision of the openings permitting the insertion of the spring side bearing elements. This feature is of advantage inasmuch as it enables the invention to be installed in already existing railroad equipment. As hammering of bearings will be prevented the life of the truck and other parts should be greatly lengthened and as the employment of this bearing structure eliminates the tendency of the car to develop side roll or sway there will be less racking of the car body as the result of the weaving. It is believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car, a body bolster having its underside formed with an opening, a housing mounted within the opening and secured to the bolster, a side bearing element vertically slidably mounted within the housing, a spring within the housing urging said side bearing element downwardly, means for limiting the downward movement, comprising brackets secured to the underside of the body bolster, and projections on the side bearing element engageable with said brackets.

2. In a railway car having a body bolster, the bolster being provided with an opening, a housing extending upwardly within the opening and secured to the bolster, a vertically slidable side bearing element mounted within the housing, a spring within the housing urging said side bearing element downwardly, and stop means carried by the underside of the bolster for limiting the downward movement of the side bearing element.

3. In a railway car, a body bolster having a bottom plate formed with an opening, a housing extending upwardly within the opening and having an outstanding flange lying against and secured to the bottom plate beyond the opening, a downwardly spring-pressed side bearing element mounted within the housing and adapted to cooperate with the truck side bearings, and stop brackets secured to said flange for limiting downward movement of the side bearing element.

4. In a railway car, a body bolster having a bottom plate provided with an opening, a housing extending upwardly through the opening and secured to the sides of the bolster, said housing having an outstanding flange secured to the bottom plate, a side bearing element vertically slidably mounted within the housing for cooperation with a truck side bearing, and spring means urging said side bearing element downwardly.

5. In a railway car, a body bolster having a bottom plate provided with an opening, a housing extending upwardly through the opening and secured to the sides of the bolster, said housing having an outstanding flange secured to the bottom plate, a side bearing element vertically slidably mounted within the housing for cooperation with a truck side bearing, and spring means urging said side bearing element downwardly, said housing extending from side to side of the bolster and being secured thereto at the sides.

6. In a railway car, a body bolster having a bottom plate provided with an opening, a housing extending upwardly through said opening, means securing the housing to the opposite sides of the bolster, a vertically movable side bearing element slidable within the housing and adapted for cooperation with a truck side bearing, spring means located within the housing for urging the side bearing element downwardly, and means for adjusting the side bearing element initially with respect to the housing.

7. In a railway car, a body bolster, a housing secured within the body bolster and opening out to the bottom thereof, a side bearing element slidably mounted within the housing and adapted to cooperate with a truck side bearing, cushion means urging the side bearing element downwardly, coacting abutment means carried by the housing and the side bearing element, and means interposed between the abutment means for adjusting the side bearing element initially with respect to the housing.

8. In a railway car, a body bolster having an opening in its bottom, a housing formed as a separate member located within said opening and extending entirely across and engaging against the sides of the bolster, securing members passing through the sides of the housing and the sides of the bolster, a bearing member slidable within the housing and adapted for cooperation with a truck side bearing, and spring means located within the housing above said bearing member for urging the latter downwardly, said bearing member having portions of its side walls inwardly offset to avoid said securing elements.

9. In a railway car, a body bolster having an opening in its underside, a housing secured within said opening, a bearing member vertically slidable within said housing and having its bottom formed with an opening surrounded by an upstanding flange and radial webs, and a spring within the housing engaged upon said webs for urging the bearing member downwardly, said bearing member being adapted to cooperate with a side bearing rocker having an upstanding spud received within the opening at the bottom of the bearing member.

10. In a railway car, a body bolster having an opening in its bottom, a housing secured within the bolster at the opening, a bearing member vertically slidably mounted within said housing, spring means within the housing urging said bearing member downwardly for cooperation with a side bearing rocker forming part of a truck, said housing being provided at its top with longitudinal and transverse reinforcing webs, said webs serving as abutment means for the spring means.

11. In a railway car, a body bolster having an opening in its bottom, a housing secured within the opening, a bearing member slidable within the housing and adapted to cooperate with a side bearing forming part of a truck, a coil spring located within the housing for urging the bearing member downwardly, and means projecting inwardly from the walls of the bearing member for centering the spring.

12. In a railway car, a body bolster having an opening in its bottom, a housing extending within said opening and secured to the bolster, a bearing member vertically slidable within the housing and projecting below the lower end thereof, a spring within the housing for urging the bearing member downwardly, said bearing member having outwardly projecting portions located beneath the lower edges of the housing and engageable therewith for limiting the upward movement of the bearing member.

13. In a railway car, a body bolster having an opening in its bottom, a housing extending within said opening and secured to the bolster, a bearing member vertically slidable within the housing and projecting below the lower end thereof, a spring within the housing for urging the bearing member downwardly, said bearing member having outwardly projecting portions located beneath the lower edges of the housing and engageable therewith for limiting the upward movement of the bearing member, and means carried by the bolster and projecting inwardly beneath the outwardly projecting portions on the bearing member and engageable thereby for limiting downward movement of the bearing member.

THOMAS R. SYMINGTON.